UNITED STATES PATENT OFFICE 2,653,978

PREPARATION OF $\beta,\beta'$-BIS(ALKYLMER-CAPTO)DIETHYL ETHER

Edward L. Doerr, Dayton, Ohio, assignor to Monsanto Chemical Company, St. Louis, Mo., a corporation of Delaware No Drawing. Application February 3, 1949, Serial No. 74,465

6 Claims. (Cl. 260—609)

This invention relates to a novel method of preparing water insoluble derivatives of alkyl mercaptans. More specifically the invention relates to ethers prepared by the dehydration of alkyl mercaptoethanols.

The primary purpose of this invention is to provide useful derivatives from alkyl mercaptans, which are abundantly available at low cost. A further purpose of this invention is to provide a new chemical reaction valuable in the synthesis of various organic compounds, particularly dithia-alkyl ethers.

The method of preparing ethers by the dehydration of alcohols with sulfuric acid is well known, but this reaction ordinarily requires the use of elevated temperatures, for example 140° C. to 160° C. Furthermore, when long chain alkyl alcohols are dehydrated the method is not applicable, because of dehydration to produce olefins. Accordingly, the long chain ethers are usually prepared by the Williamson ether synthesis. It has been discovered that a different phenomenon is involved in the dehydration of $\beta$-(alkylmercapto) ethanols.

In accordance with this invention it has been found that the $\beta$-(alkylmercapto) ethanols wherein th alkyl radical has four to eighteen carbon atoms, may be converted to ethers at temperatures less than 110°, and in many cases at room temperatures, by the use of acidic esterification catalysts. Suitable acidic catalysts for converting the alkyl mercaptoethanols to the corresponding ethers are, the acids conventionally used in esterification procedures and the salts of these acids capable of generating the acid in situ during the course of the reaction. The reaction may be performed with sulfuric acid, phosphoric acid, phosphorus pentoxide, sulfonic acid, sulfur trioxide, toluene sulfonic acid, benzene sulfonic acid, hydrogen fluoride, boron trifluoride, zinc chloride, aluminum chloride, stannic chloride, sodium bisulfate, zinc sulfate, boron trifluoride complexes both organic and inorganic, and other acids and salts having acidic reactions.

Compounds of particular interest are those made from the $\beta$-(alkylmercapto) ethanols prepared by the condensation of ethylene oxide with any alkyl mercaptan wherein the alkyl group has from four to eighteen carbon atoms. The alkyl radical may be primary, secondary or tertiary. The mercaptoethanols are prepared by charging a suitable reactor with the mercaptan and bubbling ethylene oxide through it in the presence of solid alkali metal hydroxide. The reaction, which may be followed by means of periodic weighings, should be interrupted as soon as a stoichiometric proportion of the ethylene oxide has been absorbed.

The alkyl mercaptoethanols are thereafter converted to the corresponding $\beta,\beta'$-bis(alkylmercapto) diethyl ethers by contacting them with the acidic catalysts. If desired the reaction may be conducted in the presence of an inert solvent or diluent, for example toluene, dioxane, carbon tetrachloride. The reaction will often proceed readily at room temperatures and, since the reaction is exothermic, continuous or periodic cooling may be necessary to maintain the reaction under control. Generally it is desirable to conduct the reaction with the reaction flask immersed in an ice bath, and combining the reagents at a slow enough rate to permit the maintenance of the reaction temperature within the prescribed limits. The temperature used in the practice of the reaction will depend upon the particular nature of the catalyst used, very active catalysts such as sulfur trioxide, 100 percent sulfuric acid, and chlorosulfonic acid being operative at room temperatures or below room temperature, dilute acids and acid salts requiring temperatures up to 100° C. The reaction mass may thereafter be processed by dissolving it in ethanol, neutralizing the excess acid with a suitable alkali, for example sodium hydroxide, separating the insoluble inorganic salts by filtration and thereafter precipitating the ether by cooling the alcohol solution.

The new compounds are useful as plasticizers, intermediates for organic synthesis, or oil additives.

Further details of the method of preparation of the new compounds are set forth with respect to the following specific examples.

*Example 1*

A 3-necked, round-bottom flask was provided with a thermometer, and efficient rotary stirring device and a dropping funnel. The vessel was charged with 109.2 grams of $\beta$-(n-decylmercapto) ethanol which was prepared by condensing equimolecular quantities of n-decyl mercaptan and ethylene oxide, and also with 200 grams of dry carbon tetrachloride. The solution was cooled to 25° C. and 75 grams of 100 percent sulfuric acid was added dropwise at a rate which permitted the maintenance of a temperature between 25° and 30° C. by immersion of the reaction vessel in an ice bath. The resulting thick reaction mass was diluted with water, dissolved in ethanol, and neutralized with 40 percent sodium hydroxide solution. Solid sodium sulfate was precipitated and was removed by filtration of the hot ethanol solution which upon cooling produced a solid crystalline water-insoluble substance having a melting point of 43–44° C. This product was identified as β,β'-bis(n-decylmercapto) diethyl ether.

*Example 2*

The procedure of Example 1 was repeated except that β-(n-dodecylmercapto) ethanol was used. The white crystalline product obtained had a melting point of 54–56° C. and was identified as β,β'-bis(n-dodecylmercapto) diethyl ether.

*Example 3*

The procedure of the preceding example was repeated except that 71.3 grams of chlorosulfonic acid was used instead of sulfuric acid, and the reaction was conducted between 0 and 5° C. The water insoluble product recovered and recrystallized from ethanol solution was identified as β,β'-bis(n-dodecylmercapto) diethyl ether.

*Example 4*

A 1-liter, round-bottom flask provided with a reflux condenser and a Stark and Dean moisture trap was charged with 500 grams of dry toluene and 190.3 grams of β-(n-octylmercapto) ethanol and 1 ml. of 96 percent sulfuric acid. The reaction mass was refluxed for three hours at 110° C., at which time approximately nine grams of water had been collected. The product was separated as an oil at room temperature and identified as β,β'-bis(n-octylmercapto) diethyl ether.

*Example 5*

Using the apparatus identical to that used in Example 1, 58.7 grams of β-(tertiary hexadecylmercapto) ethanol was reacted with 30 grams of 100 percent sulfuric acid, using dioxane as the diluent. The water insoluble product separated was identified as β,β'-bis(t-hexadecylmercapto) diethyl ether.

*Example 6*

A 1-liter, 3-necked flask was provided with a mechanical stirring device and a liquid dropping funnel. The flask was charged with 112 grams of β-(n-octylmercapto) ethanol. The flask was cooled to a temperature of −15° C. and 500 ml. of liquid sulfur dioxide was added thereto. The dropping funnel was then charged with 52 grams of liquid sulfur trioxide. While maintaining the flask at a temperature of below −10° C. the sulfur trioxide was added dropwise over a period of twenty minutes. After the completion of the reaction the sulfur dioxide was permitted to boil off slowly. After all the sulfur dioxide had been evolved 300 ml. of water was added. The aqueous slurry was then extracted with diethyl ether and the product recovered by evaporation of the ether. The resulting compound was identified as β,β'-bis(n-octylmercapto) diethyl ether.

The invention is defined by the following claims.

I claim:

1. A method of preparing β,β'-bis(alkylmercapto) diethyl ether which comprises contacting in liquid phase β-(alkylmercapto) ethanol, wherein the alkyl radical has from four to eighteen carbon atoms, with a catalyst selected from the group consisting of acidic esterification catalysts and acid reacting salts at a temperature less than about 110° C. and separating the resultant water-insoluble product.

2. A method of preparing β,β'-bis(alkylmercapto) diethyl ether which comprises contacting in liquid phase β-(alkylmercapto) ethanol, wherein the alkyl radical has from four to eighteen carbon atoms, with an oxygen-containing sulfur acid at a temperature less than about 110° C. and separating the resultant ether.

3. A method of preparing β,β'-bis(alkylmercapto) diethyl ether which comprises contacting in liquid phase β-(alkylmercapto) ethanol with liquid sulfur trioxide in a liquid sulfur dioxide medium at a temperature less than about 110° C. and separating the resulting ether.

4. A method of preparing β,β'-bis(t-hexadecylmercapto) diethyl ether which comprises contacting in liquid phase β-(t-hexadecylmercapto) ethanol with an acidic esterification catalyst at a temperature less than about 110° C. and separating the resulting ether.

5. A method of preparing β,β'-bis(n-octylmercapto) diethyl ether which comprises contacting in liquid phase β-(n-octylmercapto) ethanol with an acidic esterification catalyst at a temperature less than about 110° C. and separating the resulting ether.

6. A method of preparing β,β'-bis(n-dodecylmercapto) diethyl ether which comprises contacting in liquid phase β-(n-dodecylmercapto) ethanol ether which comprises contacting in liquid phase β-(n-dodecylmercapto) ethanol with an acidic esterification catalyst at a temperature less than about 110° C. and separating the resulting ether.

EDWARD L. DOERR.

References Cited in the file of this patent

UNITED STATES PATENTS

| Number | Name | Date |
|---|---|---|
| 2,326,483 | Moran | Aug. 10, 1943 |
| 2,402,878 | Doumani | June 25, 1946 |
| 2,492,984 | Grosse et al. | Jan. 3, 1950 |
| 2,570,050 | Eby | Oct. 2, 1951 |